US011912903B1

United States Patent
Cascio et al.

(10) Patent No.: US 11,912,903 B1
(45) Date of Patent: Feb. 27, 2024

(54) LATEX ADDITIVE FROM RECYCLED PLASTIC

(71) Applicant: ALADDIN MANUFACTURING CORPORATION, Calhoun, GA (US)

(72) Inventors: Anthony Cascio, Calhoun, GA (US); Nathaniel Cavic, Calhoun, GA (US)

(73) Assignee: ALADDIN MANUFACTURING CORPORATION, Calhoun, GA (US)

( * ) Notice: Subject to any disclaimer, the term of this patent is extended or adjusted under 35 U.S.C. 154(b) by 0 days.

(21) Appl. No.: 18/146,162

(22) Filed: Dec. 23, 2022

(51) Int. Cl.
*C09J 121/02* (2006.01)
(52) U.S. Cl.
CPC .................. *C09J 121/02* (2013.01)
(58) Field of Classification Search
CPC ...................................................... C09J 121/02
See application file for complete search history.

(56) References Cited

U.S. PATENT DOCUMENTS

2017/0210895 A1* 7/2017 Centner ............... C08F 2/30
2021/0071049 A1* 3/2021 Gouveia ............... C09J 107/02

FOREIGN PATENT DOCUMENTS

JP          2006213814      *  8/2006

* cited by examiner

*Primary Examiner* — Robert S Jones, Jr.
*Assistant Examiner* — Jiangtian Xu
(74) *Attorney, Agent, or Firm* — Meunier Carlin & Curfman LLC (57) ABSTRACT

Undesirable materials that are frequently discarded from recycling desirable polymer-containing materials may be processed and used in the production of soft surfaces to produce soft surfaces with improved properties.

11 Claims, 2 Drawing Sheets

LATEX ADDITIVE FROM RECYCLED PLASTIC

The present invention relates to the processing and application of material that was previously discarded from processing recycled polymer-containing material streams. The material may be used in the preparation of rugs and mats.

BACKGROUND

Products such as bottles and carpets made from polymers may be recycled to produce new polymers that may be used in new bottles and carpets. The desired polymer-containing materials that are to be recycled must be separated from other undesired polymer containing and non-polymer materials before the desired polymer-containing material may be processed in a primary recycling stream. One operation that has been successfully used to separate the desirable polymer-containing material from other materials has been to first reject the undesirable materials. The undesirable material may still contain organic components such as cellulose, wood fiber, carbon, microcrystalline cellulose (MCC), starch, jute, hemp, and other related components. as well as undesirable plastics. Additionally, some desirable polymer-containing material may be unseparated from the cellulosic material and/or unseparated from the undesirable plastics. Similarly, some desirable polymer-containing material may be entrained with the undesirable material and difficult or impossible to separate. Much of the matter separated from the desirable polymer-containing material has previously been categorized as undesirable material and has previously been relegated to a landfill. In some few cases, portions of the undesirable material have gone to secondary recycling streams for further processing.

In the primary recycling stream, the desirable polymer-containing material may still contain some undesirable material. The mass of desirable polymer-containing material may be ground into flakes then washed to separate the desirable polymer-containing material from any undesirable material which may contain cellulosic material as well as some undesirable plastics. The step of washing and separating the materials will leave a fairly pure mass of desirable polymer, which may be gathered, dried, and processed while the undesirable material may be washed away. In the wash, some desirable polymer-containing material may be unseparated from the cellulosic material and/or unseparated from the undesirable plastics. Similarly, some desirable polymer-containing material may be entrained with the undesirable material and difficult or impossible to separate. The resulting undesirable material may be further processed to produce a sludge that will usually contain organic components such as cellulose, wood fiber, carbon, microcrystalline cellulose (MCC), starch, jute, hemp, and other related components as well as some portion of the desirable polymer-containing material. This sludge has previously been sent to a landfill.

In some exemplary steps to produce some soft surfaces, such as carpets, carpet tiles, mats, and rugs, a latex preparation may be used as a pre-coat, a skip coat, or both. Latex preparations used in the preparation of soft surfaces may contain fillers and other additives such as, but not limited to, viscosity enhancers, thickening agents, soaps, anti-foaming agents, detergents, waxes, antibacterials, and similar additives known to those ordinarily skilled in the art. Those ordinarily skilled in the art know how to make latex preparations of desirable characteristics that produce expected and desirable results when used in the manufacture of soft surfaces. As a non-limiting example, a carpet or carpet tile may have more fillers and thickeners than a bathmat. It may be desirable for the carpet or carpet tile to have a specific heft or weight while it may be desirable for a bathmat to have a much lighter weight. The heft or weight of a soft surface may be controlled in part by the addition or reduction of a filler in the latex preparation.

BRIEF SUMMARY

Applicants have found ways to process the undesirable materials from recycling desirable polymer-containing materials and apply it in the production of carpet to produce carpet with improved properties.

In a first independent aspect, the invention relates to a composition for bonding a backing to a carpet face comprising: between about 15% and about 25% by weight of a latex formulation; between about 60% and about 75% by weight of a filler, wherein the filler is comprised of between about 1% and about 50% by weight of a cellulosic and plastic compound, wherein the cellulosic and plastic compound comprises between about 1% and about 50% by weight of water; and the remainder preferably water. In an alternative embodiment, a non-aqueous solvent may be used with or without additives. The additives for this alternative embodiment may comprise an anti-foaming agent, a fungicide, a coupling agent, or other additives that are known to those ordinarily skilled in the art.

In a second independent aspect, the invention relates to a method of making a latex formulation, comprising: mixing between about 15% and about 25% by weight of a latex base with between about 60% and about 75% by weight of a filler, wherein the filler is comprised of between about 1% and about 50% by weight of a cellulosic and plastic compound, wherein the cellulosic and plastic compound comprises between about 1% and 50% by weight of water; and mixing with an amount of water where the amount of water is preferably the remaining weight percent.

In a third independent aspect, the invention relates to a method of calculating the amounts of the components needed to make a latex formulation, comprising: provide a total weight of the latex formulation; calculate a weight of a latex base by multiplying the total weight by a first number that is between about 15% and about 25% to yield a latex base weight; calculate a weight of a filler by multiplying the total weight by a second number that is between about 60% and about 75% to yield a total filler weight; calculate a weight of a cellulosic and plastic compound filler by multiplying the total filler weight by a third number that is between 1% and 50% to yield a cellulosic and plastic compound filler weight; subtract the cellulosic and plastic compound filler weight from the total filler weight to yield a base filler weight; subtract from the total weight the values of the latex base weight and the total filler weight to yield a weight of water; and wherein the amounts of the components needed to make the latex formulation are the weight of the base latex, the weight of the cellulosic and plastic compound filler, the weight of the base filler, and the weight of the water.

In a fourth independent aspect, the invention relates to a method of making a cellulosic and plastic compound, comprising: providing an amount of plastic comprising pieces of plastic wherein some cellulosic material adheres to at least a portion of the pieces of plastic; and grinding the amount of plastic.

In a fifth independent aspect, the invention relates to a method of preparing an amount of latex formulation with the cellulosic and plastic compound according to the fourth independent aspect, comprising: providing an amount of latex base consisting of between about 15% and about 25% of the weight amount of the latex formulation; providing an amount of filler consisting of between about 60% and about 75% of the weight amount of the latex formulation, wherein a portion of between 1% and 50% of the amount of filler comprises the cellulosic and plastic compound; mixing an amount of water with the amount of latex base with the amount of filler, wherein the amount of water, the amount of latex base, and the amount of filler preferably forms at least 90% by weight of the amount of latex formulation or equals the amount of latex formulation.

In a sixth independent aspect, the invention relates to a soft surface product for floor, wall or ceiling, wherein said soft surface product comprises a first face formed from a textile, and a second face opposite said first face is formed by a backing adhered directly to said textile, or indirectly to said textile by means of at least bonding means, wherein said backing and/or said bonding means comprise filler materials, said filler materials being a cellulosic and plastic compound.

Descriptions of these inventions will be defined in the appended independent claims, while preferred embodiments are defined in the dependent claims.

DETAILED DESCRIPTION

Recycling polymers such as polyethylene terephthalate (PET), polypropylene (PP), polyethylene (PE), and similar recyclable polymers from polymer-containing products often includes the process of removing material that is mixed in with the desirable polymer product. As a non-limiting example, this may include removing undesirable plastics from the stream of desirable plastics. In a nonlimiting, exemplary example, PET may be a desirable polymer to recycle, and some non-PET materials may be in this stream. Mechanical processes may be initially employed to remove as much of the non-PET materials from the PET stream as possible. The non-PET materials may have some amount of cellulosic materials attached or entrained with non-PET plastics where the cellulosic materials may comprise: cellulose; wood fiber; carbon; microcrystalline cellulose (MCC); starch; jute; hemp; paper; cardboard; and other related components, and the non-PET plastics may comprise: polypropylene (PP); polyethylene (PE); vinyl; ABS (acrylonitrile butadiene styrene); polyvinyl chloride (PVC); polystyrene (PS); nylon; and polytrimethylene terephthalate (PTT). For example, a bundle of PET water bottles may contain some PP containers that have paper and/or plastic wrappers on them. The PP containers with their wrappers would be separated from the PET water bottles at this stage. The PP containers with their wrappers would be considered undesirable plastics with cellulosic materials and would likely be discarded.

A subsequent step of processing the incoming PET stream would be to remove adhering non-PET plastics and other adhering cellulosic materials from the PET stream. These may be paper labels and non-PET bottle caps. One method of separating the desirable polymer from undesirable materials is to grind the entirety of the mass and separate the materials in a wash. For example, a paper label secured with an adhesive to a PET water bottle may be removed in a water and detergent wash. Also, the ground bits of a water bottle cap may be floated away from the flakes of PET. This wash step creates an amount of wastewater comprising particles of cellulose, wood fiber, carbon, microcrystalline cellulose (MCC), starch, jute, hemp, paper, cardboard, and other related components along with some undesirable plastics. In the past, this matter has typically also been discarded.

As will be known to those familiar with the various processes of recycling plastics, many plastic containers have wrappers on them. Some of these wrappers are paper or light and flexible plastic labels with printing or designs on them.

The light and flexible plastic label wrappers are sometimes secured to a container by placing an adhesive on a leading end of the light and flexible plastic label, attaching that end to the container, wrapping a majority of the light and flexible plastic label around the container, and then securing the trailing end of the light and flexible plastic label to the container by adding some adhesive to the trailing end and pressing that over the leading end of the light and flexible plastic label. When the container is shredded, the light and flexible plastic label is easily separated from the desirable recyclable plastic in a wash or through other means that are known. The parts of the container that have the leading and trailing ends of the light and flexible plastic label secured thereto may continue to have the light and flexible plastic label secured to them even after shredding and washing. In some cases, these portions of the label may be separated from the desirable plastic in a wash. In other cases, the adhesive may not yield to a wash where the shreds will still be secured to portions of the labels. These shreds that still have portions of labels attached may be processed as described herein to become some of the components of the cellulosic and plastic compound.

Paper labels are sometimes secured to plastic containers in a similar way. In some cases, the majority of the paper labels may be separated from the desirable plastic by tearing it away in a shredding operation and simply by blowing the unsecure parts of the paper away from the recycling stream. Similar to the light and flexible plastic labels, some portions may be separated in a wash, while some portions of the paper labels may continue to adhere to the desirable plastic. In some cases, these portions of the label may be separated from the desirable plastic in a wash. In other cases, the adhesive may not yield to a wash where the shreds will still be secured to portions of the labels. These shreds that still have portions of labels attached may be processed as described herein to become some of the components of the cellulosic and plastic compound.

In both these non-limiting examples, the printing and/or designs upon the shreds that still have label material adhered to them may contain ink, dyes, and the like. Applicant has found that the inclusion of these inks, dyes, and the remaining adhesive material may be included in the production of cellulosic and plastic compound as disclosed and taught herein without any adverse effect.

Applicant has invented processes and methods to make use of previously discarded materials to improve the quality of carpets and rugs. In one of many embodiments that may be envisioned by those in possession of the inventions and teachings disclosed herein, the rejected cellulosic material and undesirable plastics may be dried and mixed with other materials to be used to secure the tufts to a backing in a soft surface such as, but not limited to a rug, a mat, a carpet, or a carpet tile.

The inventions and teachings disclosed herein may be applied to all of the cellulosic and rejected plastic material reclaimed from recycled plastics that are known to those ordinarily skilled in the art.

In a first general, and non-limiting embodiment, a quantity of cellulosic and rejected plastic material may be separated from the desirable polymer-containing material and used as a filler in a latex composition that may be used in the formation of a soft surface, such as a rug, a mat, a carpet, or carpet tiles. This latex formulation may be used as a pre-coat, as a skip coat, as both, and/or as other components in manufacturing those and other soft surfaces.

In a second general, and non-limiting embodiment, a quantity of cellulosic and entrained plastic material may be separated from most of the wash water by mechanical processes such as, but not limited to, centrifuging and settling. The remaining cellulosic and entrained plastic material may be further dried to reduce the moisture content. Applicant has found that cellulosic and entrained plastic material with some residual moisture content may be used as a filler in a latex composition that may be used in the formation of a rug, a mat, a carpet, or carpet tiles. Again, the latex formulation may be used as a pre-coat, as a skip coat, as both, and/or as other components in manufacturing those and other soft surfaces.

In both of these general and non-limiting embodiments, the cellulosic and entrained or rejected plastic material may be added to a latex preparation at a weight percent of up to 50%. As the weight percentage of the cellulosic and entrained or rejected plastic material is increased, the amount of filler may be reduced along with some amounts of viscosity enhancers, thickening agents, soaps, anti-foaming agents, detergents, waxes, antibacterials, and other additives known to those ordinarily skilled in the art. If the moisture content of the cellulosic and plastic compound is high, the process may reduce an overall need of additional water.

By increasing the amount of cellulosic and rejected or entrained plastic material in the latex formulation, the viscosity of the latex formulation increases such that the amount of thickener may be reduced to obtain a desired viscosity of the formulation. Alternatively, water may be added to a latex formulation containing the cellulosic and rejected or entrained plastic material to obtain a desired viscosity.

Manufacturing soft surfaces with latex formulations containing between 1% and 50% (by weight) of cellulosic and rejected or entrained plastic material within a latex formulation has provided soft surfaces with increased tuft bind and delamination properties as compared to soft surfaces made with a latex formulation that doesn't include the cellulosic and rejected plastic material.

BRIEF DESCRIPTION OF THE FIGURES

With the intention of better showing the characteristics of the invention, herein after, as an example without any limitative character, some preferred embodiments are described, with reference to the accompanying drawings, wherein.

DESCRIPTION

In a first exemplary, but non-limiting embodiment, the process for obtaining and using the cellulosic and entrained plastic material obtained from plastics such as, but not limited to, PET, PP, and PE will be disclosed.

Figure 1:
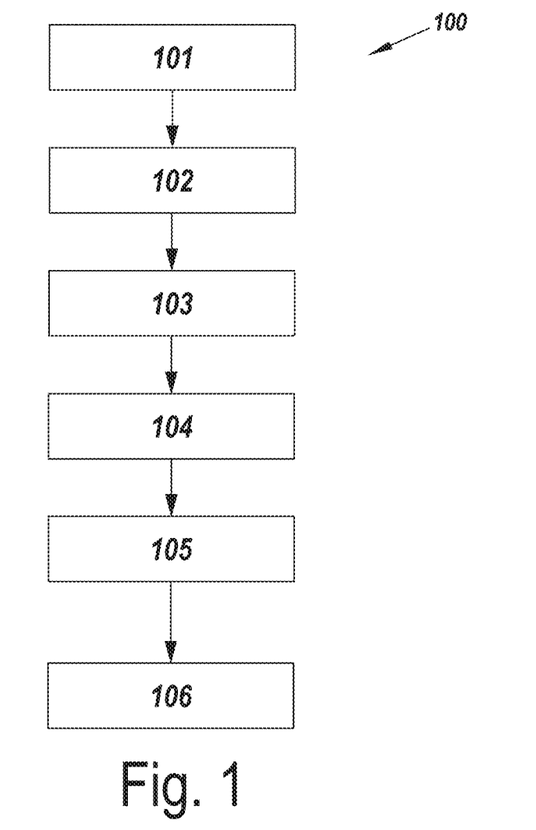
FIG. 1 represents a method of obtaining cellulosic and entrained plastic material according to the invention.

FIG. 1 represents an exemplary, but non-limiting, method 100 of obtaining cellulosic and entrained plastic material from a received recycling mass of plastics according to the inventions disclosed and taught herein.

It will be known to those ordinarily skilled in the art that a recycling mass of plastics may include materials that are not recyclable. While it is hoped that the vast majority of the received plastic recycling mass will be recyclable materials such as, but without limitation, polymer products, the received plastic recycling mass may also include quantities of plastic materials that are not readily recyclable such as vinyl, ABS, PVC, PS, and similar. Also, the mass, which may be in the form of a bale, may include other materials that are not recyclable in a plastic recycling process such as metal, paper, wood chips, sand, dirt, and similar matter.

Figure 2:
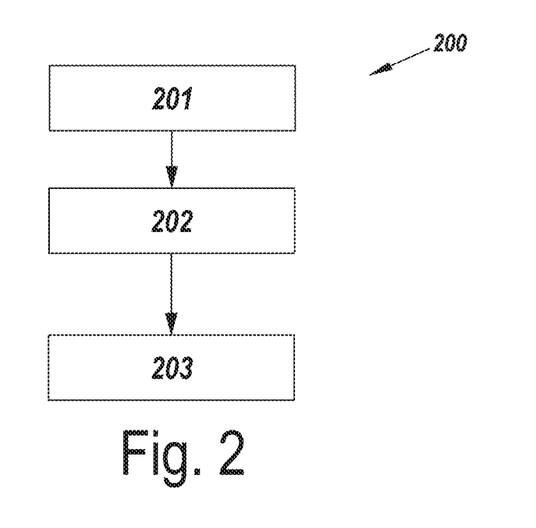
FIG. 2 represents a method of obtaining cellulosic and rejected plastic material according to the invention.

In one nonlimiting example of processing the incoming plastic recyclable mass, Step 101 illustrates that a quantity of recycling mass may be received and initially processed. This incoming plastic recyclable mass may be a bale of PET plastic water bottles. Alternatively, the incoming recyclable mass may be a quantity of PE or PP materials, which may also be processed using this method 100. This initial processing may include unbundling the mass, placing the mass on a conveyor belt, and processing the conveyed stream of the plastic recycling mass with automatic sorters that may remove metals and other materials that will no longer be part of this process. Step 101 also illustrates that undesirable plastics may be separated from the stream of desirable plastics. As a nonlimiting example, vinyl, ABS, PVC, PS, PE, PP nylon, PTT, and similar plastic materials may be separated from a stream of PET-containing material, which in this example is the desirable plastic recycling mass. The vinyl, ABS, PVC, PS, PE, PP nylon, PTT, and similar plastic materials are rejected plastics from this method 100 but may be used in a separate method 200 as illustrated in FIG. 2.

Step 102 illustrates that the desirable plastic recycling mass is ground by grinders into flakes. Some cellulosic material, as well as other material, will go through the grinding process as well. The grinding of the plastic recycling mass will grind the desired plastic along with the other matter in the plastic recycling mass. As a non-limiting example, bottles of PET will be ground with bottle caps made from high density polyethylene (HDPE) and other material. Some of the cellulosic material will be in the form of paper labels that may adhere to the desired plastic.

Step 103 illustrates that the ground plastic recycling mass may be washed at least once. In some cases, applicant has found that more cellulosic material, usually in the form of paper labels adhering to plastic water bottles, may be separated from the PET, PP, or PE by having more than one wash. In these cases, the first wash may loosen the cellulosic material from the plastic and the second wash may separate it. While additional washes may provide even more separation of cellulosic material from the plastics, applicant has found satisfactory results by having one or two washes.

Step 104 illustrates that the cellulosic material portion of the washed and ground plastic recycling mass is separated from the recyclable plastic material as cellulosic sludge. This process is not precise, and some desirable plastic may be entrained with the cellulosic material as it is separated from the desirable plastic. That is to say that the material that is washed away from the desirable recyclable polymer-containing material may comprise cellulosic material as well as entrained plastic material. In this step, other material, such but not limited to sand and other undesirable plastics such as HDPE, may also be separated and processed in a different stream. In some preferred embodiments, the cellulosic and entrained plastic sludge contains cellulose, wood fiber, carbon, microcrystalline cellulose (MCC), starch, jute, hemp, and other related components as well as some plastics where PET, PP, and PE are the major components. In this step, all of this will still be wet from the wash water.

Applicant has found that the cellulosic and entrained plastic sludge may be a ratio of approximately 70% cellulosic material by weight and approximately 30% plastics where PET, PP, and PE are the major components, when it is completely devoid of water. However, applicants have found that retaining a moisture content of between 5% by weight and 50% in the dried cellulosic sludge is a preferred embodiment. In this embodiment, the remaining moisture content in the dried cellulosic and entrained plastic particulate matter will reduce the amount of water that may be needed in the latex formulation. This 70%/30% ratio is not a strict ratio but may vary from a ratio of about 50% cellulosic material by weight and about 50% plastics to about 90% cellulosic material by weight and about 10% plastics. Preferred embodiments have a ratio of about 80% cellulosic material by weight and about 20% plastics to about 60% cellulosic material by weight and about 40% plastics. More preferred embodiments have a ratio of about 75% cellulosic material by weight and about 25% plastics to about 65% cellulosic material by weight and about 35% plastics. In all of those embodiments, the moisture content of the dried cellulosic and entrained plastic particulate matter is between 5% by weight and 50%.

Step 105 illustrates that the cellulosic and entrained plastic sludge may be dried to have a moisture content of between about 5% by weight and about 50%. Preferred embodiments have a moisture content of between about 5% by weight and about 40%. Drying the cellulosic and entrained plastic sludge may be accomplished in many ways known to those ordinarily skilled in the art. It may be pressed in a filter, kilned in an oven, left out to naturally dehydrate, dried using combinations of those methods, or in any other method ordinarily known and used by those ordinarily skilled in the art. Applicant has found that drying the cellulosic and entrained plastic sludge by heating it to a temperature of between 150° C. and 220° C. for a period of between 1 and 3 hours will drive off a sufficient amount of residual water and will also kill any biological organisms and eliminate all odors. A preferred temperature for heating is between 180° C. and 200° C. In some embodiments, higher temperatures may be used for shorter times. Preferred times may range from 1.5 hours to 2.5 hours, with a preferred time of 2 hours with a temperature of 200° C. That is to say that drying the wet cellulosic and entrained plastic sludge as described herein will still leave it with a moisture content of between about 5% by weight and 50%.

In an envisioned embodiment, the cellulosic sludge may be dried through normal evaporation with a biocidal substance such as an antibacterial. This step would yield a dried cellulosic and entrained plastic particulate matter as described.

Step 106 illustrates that the dried cellulosic and entrained plastic particulate matter may be ground or otherwise processed to produce particles with a more consistent size. The ground and dried cellulosic and entrained plastic particulate matter may be in the forms of coarse or fine granules or in coarse or fine powders, or a mixture of those forms. In some embodiments the dried cellulosic and entrained plastic particulate matter may be processed to produce particles that are less than 5 mm$^3$ in size. In some preferred embodiments the dried cellulosic and entrained plastic particulate matter may be processed to produce particles, granules, or flakes of powder that are less than 2.5 mm$^3$ in size. In other preferred embodiments the dried cellulosic and entrained plastic particulate matter may be processed to produce particles, granules, or flakes of powder that are less than 1 mm$^3$ in size.

In an alternative embodiment, rather than grinding or otherwise processing the dried cellulosic and entrained plastic particulate material to render the matter into desired size particles, granules, or flakes of powder, the dried cellulosic and entrained plastic particulate material may be conglomerated or pelletized. In some embodiments the dried cellulosic and entrained plastic particulate matter may be conglomerated or pelletized to produce pellets that are less than 5 mm$^3$ in size. In some preferred embodiments the dried cellulosic and entrained plastic particulate matter may be conglomerated or pelletized to produce pellets that are less than 2.5 mm$^3$ in size. In other preferred embodiments the dried cellulosic and entrained plastic particulate matter may be conglomerated or pelletized to produce pellets that are less than 1 mm$^3$ in size. Applicant has found that no additional binder agents are needed for the pellets to retain a cohesive form.

Soft surfaces, such as but not limited to rugs, mats, carpets, and carpet tiles, formed by tufting yarns through a backing generally need a pre-coat that is applied to the back of the tufts to secure the yarn to the primary backing, or face. That is to say that a securing agent will anchor the pile and prevent any tufts from being pulled out through ordinary use. If a secondary backing is used in the production of a carpet, the secondary backing may be secured to the primary backing with the pre-coat, or with a separate skip-coat. In many embodiments, the pre-coat and the skip-coat may be latex based.

Once the dried cellulosic and entrained plastic particulate matter is produced, it may be used in forming a carpet according to the inventions disclosed and taught herein.

A latex-based coating comprising some amount of dried cellulosic and entrained plastic particulate matter may be used for a pre-coat or skip-coat in the same way that ordinary latex-based coatings are used. However, some preparations will need to be made before formulating and mixing the latex-based coating, including planning for its application properties, which include a viscosity and a density.

In some embodiments, a desirable initial viscosity and a desirable initial density of the latex-based coating may be established to provide a desired thickness and weight of the final carpet. The properties of the latex-based coating may be configured before mixing the needed materials. Additions of the dried cellulosic and entrained plastic particulate matter will increase both the density and the viscosity of a latex-based coating when using the other materials in their normal proportions. From that, by using the dried cellulosic and entrained plastic particulate matter, the relative proportions of certain other materials may be reduced to produce a desired viscosity and density.

As one exemplary embodiment, without limitation, a latex-based coating may be made from about 20% of an aqueous latex product, such as are commonly known by those ordinarily skilled in the art; about 65% of a filler, such as calcium carbonate; about 12% water; and the remaining about 1% by weight to about 3% made of a combination of soap, detergent, thickening agents, waxes, antibacterials, and other components. If some amount of the dried cellulosic and entrained plastic particulate matter having a moisture content of 40% were to be used, both the amount of water and the amount of filler may be reduced. On the other hand, using some amount of the dried cellulosic and entrained plastic particulate matter having a moisture content of 5% were to be used, the amount of the filler may be reduced, but some additional water may need to be added.

Applicant has found that exemplary embodiments of a latex-based coating may be made with a dried cellulosic and entrained plastic particulate matter having a moisture content of between 5% and 50% comprising between 1% and 15% of the dried cellulosic and entrained plastic particulate matter. In one embodiment, a latex-based coating may be made with a dried cellulosic and entrained plastic particulate matter having a moisture content of between 5% and 45% comprising between 1% and 10% of the dried cellulosic and entrained plastic particulate matter. This embodiment yields soft surfaces that are as flexible as soft surfaces made with latex formulations without any dried cellulosic and entrained plastic particulate matter. A preferred latex-based coating may be made with a dried cellulosic and entrained plastic particulate matter having a moisture content of between 5% and 40% comprising between 3% and 7% of the dried cellulosic and entrained plastic particulate matter. Another preferred latex-based coating may be made with a dried cellulosic and entrained plastic particulate matter having a moisture content of between 5% and 40% comprising about 5% of the dried cellulosic and entrained plastic particulate matter. For the last embodiment, that is to say that a latex-based coating may be made with about 5% by weight of the dried cellulosic and entrained plastic particulate matter when the dried cellulosic and entrained plastic particulate matter has a moisture content of between 5% and 40% by weight with corresponding reductions in the amounts of water and filler where the filler is primarily calcium carbonate to be used in the manufacture of soft surfaces that are as flexible as soft surfaces made with latex formulations without any dried cellulosic and entrained plastic particulate matter. This, and all exemplary latex formulations provided may also include viscosity enhancers, thickening agents, soaps, anti-foaming agents, detergents, waxes, antibacterials, and other additives known to those ordinarily skilled in the art.

Another preferred latex-based coating may be made with a dried cellulosic and entrained plastic particulate matter having a moisture content of between 5% and 40% comprising between 10% and 15% of the dried cellulosic and entrained plastic particulate matter. This embodiment yields soft surfaces that are more rigid than soft surfaces made with latex formulations without any dried cellulosic and entrained plastic particulate matter. That is to say that a latex-based coating may be made with between 10% and 15% by weight of the dried cellulosic and entrained plastic particulate matter when the dried cellulosic and entrained plastic particulate matter has a moisture content of between 5% and 40% by weight with corresponding reductions in the amounts of water and filler where the filler may be primarily calcium carbonate to be used in the manufacture of soft surfaces that are more rigid than soft surfaces made with latex formulations without any dried cellulosic and entrained plastic particulate matter.

Table 1 represents an exemplary embodiment of a latex formulation containing dried cellulosic and entrained plastic particulate matter that may be used as a pre-coat and/or a skip coat in manufacturing a carpet where the flexibility of the carpet will be approximately the same as that of a carpet made with a latex solution that does not contain any dried cellulosic and entrained plastic particulate matter.

TABLE 1

| Component | Percent Amount by Weight |
|---|---|
| Water | 10% to 14% |
| Base Latex | 15% to 20% |
| Filler | 60% to 65% |
| Other components | 1% to 3% |
| Dried Cellulosic and Entrained Plastic Particulate Matter | 3% to 7% |

It should be noted that in this exemplary embodiment, each exemplary plastic may comprise 100% of the process, or mixtures of the plastics may be used. That is to say that in this first exemplary process, the desirable polymer may be PET such that PP and PE materials will be rejected. Alternatively, the desirable polymer may be any combination of PET and PE such that PP is rejected.

In a second exemplary, but non-limiting embodiment, the process for using the cellulosic material from high label material such as, but not limited to polyvinyl chloride (PVC); polystyrene (PS); acrylonitrile butadiene styrene (ABS); polyethylene (PE); polypropylene (PP); polyethylene terephthalate (PET); nylon; polytrimethylene terephthalate (PTT); and polyethylene terephthalate glycol (PETG) will be disclosed.

High label material may be obtained directly from recyclers. Alternatively, high label material may be obtained from a mass of recycled plastic as was disclosed in the previous method 100. For example, a bale of curbside-obtained PET may still contain other types of plastic that may be rejected before the PET, which is the desirable polymer-containing material, is recycled into a PET-containing product. The rejected stream may include non-desirable plastics such as, but not limited to: PVC, PS, ABS, PE, PP, nylon, PTT, and PETG. In some cases, a high-volume recycling operation may not be precise and will not remove all of the PET from this stream of rejected plastic such that the high label material will contain PVC, PS, ABS, PE, PP, PETG, PET, and similar plastics that may be found in curbside-obtained PET bales.

FIG. 2 represents an exemplary, but non-limiting, method 200 of obtaining a cellulosic and rejected plastic material from a received recycling mass of plastics using the exemplary rejected plastic stream from the previous method 100 in this example according to the inventions disclosed and taught herein.

Step 201 illustrates that a quantity of rejected plastics may be received and initially processed. This initial processing may include placing the mass on a conveyor belt and processing the conveyed stream of the rejected plastics with automatic sorters that may remove metals and other materials that will no longer be part of this process.

Step 202 illustrates that the rejected plastic may be ground by grinders into flakes. Some cellulosic material, as well as other material, will go through the grinding process with the rejected plastic. The cellulosic material may comprise cellulose; wood fiber; carbon; microcrystalline cellulose (MCC); starch; jute; hemp; paper; cardboard, and other related components. The grinding of the rejected plastic with cellulosic material will grind the rejected plastic along with the cellulosic material. As a non-limiting example, some of the cellulosic material will be in the form of paper and cardboard that may adhere to the desired plastic.

Step 203 illustrates that the ground rejected plastic with cellulosic material may be further ground or otherwise processed to produce particles with a more consistent size.

The ground rejected plastic with cellulosic material may be in the forms of coarse or fine granules or in coarse or fine powders, or mixtures of those forms.

In this exemplary embodiment, a small amount of moisture of up to 20% by weight may be retained in the ground rejected plastic with cellulosic material. Preferred embodiments have about 10% or less of moisture, with a more preferred embodiment having about 5% or less moisture.

In this exemplary embodiment, applicant has found preferable ratios of the cellulosic material and the plastics. In one embodiment, the ratio of cellulosic material content may comprise about 30% by weight with the plastics comprising about 70% by weight. In a preferred embodiment, the ground rejected plastic with cellulosic material may comprise a ratio of about 15% by weight of the cellulosic material with the plastic comprising about 85% by weight. In a more preferred embodiment, the ground rejected plastic with cellulosic material may comprise a ratio of about 10% by weight of the cellulosic material with the plastic comprising about 90% by weight comprising PVC, PS, ABS, PE, PP, PETG, and PET. In a preferred embodiment, the ground rejected plastic with cellulosic material may comprise a ratio of about 7% by weight of the cellulosic material with the plastic comprising about 93% by weight comprising PVC, PS, ABS, PE, PP, PETG, nylon, PTT, and PET. In all of these embodiments, the moisture content of the ground rejected plastic with cellulosic material may be up to 20% by weight, with a preference for a moisture content of about 10% or less by weight, with a more preferred embodiment having a moisture content of less than about 5% by weight.

In an alternative embodiment, rather than grinding or otherwise processing the ground rejected plastic with cellulosic material to render the matter into desired granules or a powder, the ground rejected plastic with cellulosic material may be conglomerated or pelletized. In some embodiments the ground rejected plastic with cellulosic material may be conglomerated or pelletized to produce pellets that are less than 5 mm³ in size. In some preferred embodiments the ground rejected plastic with cellulosic material may be conglomerated or pelletized to produce pellets that are less than 2.5 mm³ in size. In other preferred embodiments the ground rejected plastic with cellulosic material may be conglomerated or pelletized to produce pellets that are less than 1 mm³ in size. Applicant has found that no additional binder agents are needed for the pellets to retain a cohesive form. In some cases, heat may be applied during the forming stage to form cohesive pellets. Applicant has found that one way of applying heat to conglomerate or pelletize the ground rejected plastic with cellulosic material is to apply sufficient heat to cause plasticizing or melting of the ground rejected plastic with cellulosic material to a point that it becomes tacky.

Like the previous method 100, a latex-based coating comprising some amount of ground rejected plastic with cellulosic material from this exemplary method 200 may be used for a pre-coat or skip-coat in the same way that ordinary latex-based coatings are used. Again, some preparations will need to be made before formulating and mixing the latex-based coating, including planning for its application properties, which include a viscosity and a density.

In some embodiments, a desirable initial viscosity and a desirable initial density of the latex-based coating may be established to provide a desired thickness and weight of the final carpet. The properties of the latex-based coating may be configured before mixing the needed materials. Additions of the ground rejected plastic with cellulosic material will increase both the density and the viscosity of a latex-based coating when using the other materials in their normal proportions. From that, by using the ground rejected plastic with cellulosic material, the relative proportions of certain other materials may be reduced to produce a desired viscosity and density.

Preferred embodiments of this process may result in a cellulosic particulate matter having a ratio of about 30% cellulosic material by weight and about 70% plastics with a moisture content of between 1% by weight and 10%. Other preferred embodiments have a ratio of about 15% cellulosic material by weight and about 85% plastics to about 10% cellulosic material by weight and about 90% plastics.

In an envisioned embodiment, additional wet or damp cellulosic material, such as but not limited to wet paper and wet cardboard may be intentionally added to the plastic mass in Step 201 to produce a cellulosic mass with a higher moisture content along with a higher cellulosic material content. Preferred embodiments of this process may result in a cellulosic particulate matter comprising a ratio of about 70% cellulosic material by weight and about 30% plastics with a moisture content of between 5% by weight and 50%. Other preferred embodiments may be similar to those disclosed elsewhere herein.

When some amount of the ground rejected plastic with cellulosic material having a moisture content of about 10% or less were to be used in formulating a latex-based coating, the amount of calcium carbonate may be reduced.

Applicant has found that exemplary embodiments of a latex-based coating may be made with a ground rejected plastic with cellulosic material having a moisture content of less than about 10% by weight where the filler is replaced with between 1% and 50% of the rejected plastic with cellulosic material. That is to say that up to 50% by weight of the traditional filler of calcium carbonate, sand, aluminum trihydrate, bauxite, magnesium hydroxide, or similar, may be replaced by the rejected plastic with cellulosic material, when it has a moisture content of less than 10%, in a latex formulation. A preferred latex-based coating may be made with a ground rejected plastic with cellulosic material having a moisture content of between about 5% and about 10% by weight comprising a filler having between about 10% and about 45% of the rejected plastic with cellulosic material. Another preferred latex-based coating may be made with a rejected plastic with cellulosic material having a moisture content of between 5% and 10% by weight comprising a filler having between about 10% and about 40% by weight of the rejected plastic with cellulosic material.

Table 2 represents an exemplary embodiment of a latex formulation that may be used as a pre-coat and/or a skip coat in manufacturing a carpet, when combined with some amount of ground rejected plastic with cellulosic material.

TABLE 2

| Component | Percent Amount by Weight |
| --- | --- |
| Water | 3% to 10% |
| Base Latex | 19% to 24% |
| Filler | 65% to 75% |
| Other components | 1% to 3% |

In this exemplary embodiment, some portion of the base filler may be replaced by a similar weight of the rejected plastic with cellulosic material by an amount of up to 50% by weight. That is to say that if 100 pounds of a latex formulation was desired it could be made with 70 pounds of filler made up of 35 pounds of calcium carbonate and 35 pounds of the ground rejected plastic with cellulosic material. Another example would be to make the filler with 45 pounds of calcium carbonate and 25 pounds of ground rejected plastic with cellulosic material.

Figure 3:
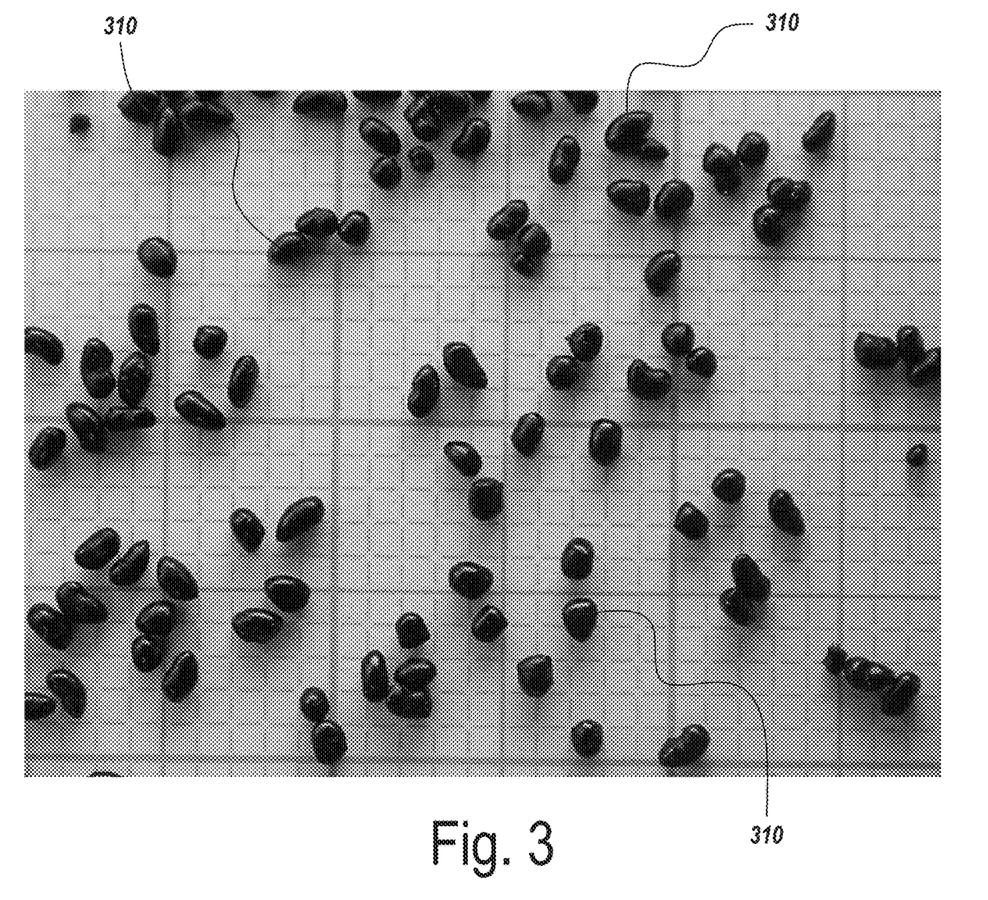
FIG. 3 illustrates a pelletized form of cellulosic and rejected plastic material according to the invention.

Applicant's inventions disclosed and taught herein are not limited to those exemplary embodiments. The inventions are also not limited to masses of plastic and cellulosic material from bottles. In one non-limiting exemplary embodiment, Applicant has utilized the processes and methods disclosed and taught herein with carpet. A carpet made of PET and coPET was ground and pelletized into pellets 310 of less than 1 mm$^3$ in size, as shown in FIG. 3, and utilized in a latex-based adhesive.

Other materials may be used within the scope of the inventions disclosed and taught herein. Such materials include, but are not limited to: industrial and post-industrial carpet, and industrial mixed plastic waste. Those ordinarily skilled in the art will be able to utilize the inventions taught and disclosed herein to develop cellulosic and plastic combinations that may be utilized in latex-based coating formulations.

Besides the beneficial uses of the cellulosic and plastic compounds disclosed and taught herein, applicant has found that the use of the cellulosic materials, which are fibrous and organic, promotes the lowering of the density of the latex formulation, which may be utilized to reduce the weight of soft surfaces. It also acts as a viscosity booster allowing the latex formulation to become thicker than a latex formulation that does not contain any cellulosic and plastic compounds. Therefore, if thickening agents are utilized in a latex formulation, they may be reduced or replaced entirely with the inclusion of some amount of a cellulosic and plastic compound.

Similarly, the use of the plastics in the cellulosic and plastic compound may, in some cases, increase the heat capacity of latex formulations, allowing the latex to be cured more thoroughly with better adhesive qualities.

The following provides some exemplary embodiments of the inventions disclosed and taught herein.

Example 1

In a nonlimiting exemplary embodiment of the inventions taught and disclosed herein, applicant has tested a series of carpets using latex solutions that decreased the amount of traditional filler while increasing an amount of cellulosic and plastic compounds. In these, the latex solutions used calcium carbonate (CaCO$_3$) as the filler. Table 3 illustrates the compositions of the latex solution, the amount of cellulosic and plastic compounds added, and the results of tests performed on the carpets.

TABLE 3

|  | Test 1 (Control) | Test 2 | Test 3 | Test 4 |
|---|---|---|---|---|
| Water | 4.6% | 4.6% | 4.6% | 4.6% |
| Latex | 22% | 22% | 22% | 22% |
| Base Filler | 72% | 66% | 60% | 36% |
| Other components | 1.4% | 1.4% | 1.4% | 1.4% |
| Cellulosic and Plastic Compound | 0% | 6% | 12% | 36% |
| ASTM 60936 (Dry) | 4.7 lbf/in | 5.6 lbf/in | 6.2 lbs/in | 4.9 lbf/in |
| ASTM 60936 (Wet) | 1.0 lbf/in | 1.0 lbf/in | 1.3 lbs/in | 1.0 lbf/in |

In these tests, a base solution of water, latex, and the other components, which are known to those ordinarily skilled in the art, were mixed with an amount of filler. The filler, in each case was calcium carbonate.

The first test, indicated as "Test 1 (Control)", was composed of a traditional latex solution that had no cellulosic and plastic compound added. This latex composition was used as a precoat to bind a tufted carpet face to a secondary backing and to secure the tufts in place. After the latex composition had cured, samples of the carpet were prepared and tested with for delamination strength in both a dry and a wet condition using ASTM 60936 test methodology for the Delamination Strength of Secondary Backing. The dry sample required 4.7 pound-feet per linear inch to delaminate the secondary backing from the face, and the wet sample required 1.0 pound-foot per linear inch.

Subsequent samples of latex solutions were prepared where some amount of calcium carbonate filler was replaced with the same amount of cellulosic and plastic compound. In these test cases, the cellulosic and plastic compound was ground rejected plastic with cellulosic material prepared in pellets as disclosed in the second exemplary embodiment herein. As may be seen in the table, a replacement of significant amounts of the filler with the pelletized ground rejected plastic with cellulosic material results in superior delamination properties of the carpet.

Example 2

A carpet was made using a latex composition with a dried cellulosic and entrained plastic particulate matter as disclosed in the first embodiment by using the latex composition as a precoat between a tufted carpet face and a secondary backing. The composition of the latex composition by weight was approximately 19% latex; 11% water; 62.5% calcium carbonate filler; 1% soap; 1% antibacterial, and about 5.5% of the dried cellulosic and entrained plastic particulate matter having a moisture content of approximately 40% as disclosed in the first exemplary embodiment herein. A control carpet was made using a latex composition without any dried cellulosic and entrained plastic particulate matter. That latex composition was approximately 19% latex by weight; 12% water; 68% calcium carbonate filler 1% soap; and 1% antibacterial. Samples were prepared and tufts of each carpet sample were tested for bind strength using the ASTM 5833 Tuft Bind of Pile Yarn Floor Coverings methodology. The binding strength of the control carpet tufts averaged 8 pounds of force for multiple trials. The binding strength of the tufts of the carpet made using a latex composition with the dried cellulosic and entrained plastic particulate matter averaged 13 pounds of force for multiple trials.

Uses

As disclosed throughout this disclosure, one of many applications that may be envisioned by those in possession of the inventions disclosed and taught herein for the cellulosic and plastic compound may be to secure a backing to a face of a soft surface. While this use may be most readily understood by those familiar with the various processes of making soft surfaces, it must be understood that the use in making soft surfaces is only exemplary and that the use of the cellulosic and plastic compound disclosed herein has many applications that extend beyond the listed soft surfaces.

As an exemplary but non-limiting embodiment, a soft surface may be produced using the cellulosic and plastic compound for floors, walls and/or ceilings. In this, the cellulosic and plastic compound may be used to secure a face to a backing. In this embodiment, a soft surface may be made of a face, formed from a textile, adhered to a backing. In this, the first face of the textile, which may be a woven fabric, may be outwardly facing to present a desirable face to be exposed, and a second face that may be secured to the backing. The second face may be directly adhered to the backing such that a latex material is either The face and the backing may be directly or indirectly secured together. In a first non-limiting embodiment, the latex may be applied in a very thin layer such that the back side of the face may touch the backing. This may be used to secure a curtain fabric to a backing. In many embodiments, it may be desirable to have this seam between the curtain face and the backing be flexible. Alternatively, it may be desirable to have the latex cure into a more rigid bond to form a pleat or other rigid section. Both the flexible and rigid embodiments are disclosed herein and may be used together without limitation.

In the manufacture of tufted rugs and carpets, it may be desirable to have a thicker layer of latex between the face and the backing. In some of these embodiments, a layer of latex may be applied to back of the tufted face before pressing a backing onto the layer of latex. In this embodiment, the latex will cure to bond the tufted face to the backing.

The latex may also be used to secure the backstitch of the tufted yarn to the face or primary backing. The latex may be applied as a precoat to the tufted primary backing and allowed to cure, or to partially cure, so that the backstitches are secured to the primary backing. After that step, another layer of latex may be applied as a skip coat when the secondary backing is pressed into the latex. In this way, the backstitches of the tufts may be partially, or entirely covered by the precoat latex such that the skip coat will be a distinct layer between the backstitches and the secondary backing.

As is known by those ordinarily skilled in the art, the same, or different latex formulations may be used as the precoat and the skip coat. In one of many embodiments, a latex formulation using the cellulosic and plastic compound that cures to be flexible may be used as both the precoat and the skip coat of a carpet that is expected to be rolled for transport. In another embodiment, a latex formulation using the cellulosic and plastic compound that cures to be flexible may be used as a precoat while a latex formulation using the cellulosic and plastic compound that cures to be rigid may be used for the skip coat for a carpet tile where planar rigidity of the finished tile is desired to prevent curling and/or tenting.

In all of the embodiments disclosed herein along with embodiments that may be envisioned by those ordinarily skilled in the art and in possession of the disclosures and teachings herein, latex formulations comprising cellulosic and plastic compounds disclosed herein may be utilized in the same way as latex compositions that do not comprise cellulosic and plastic compounds.

The present invention is in no way limited to the herein above-described embodiments, on the contrary many such methods and processes to use cellulosic and rejected plastics may be realized according to various variants, without leaving the scope of the present invention.

The invention claimed is:

1. A composition for bonding a backing to a carpet face comprising:
   between about 15% and about 25% by weight of a latex base;
   between about 60% and about 75% by weight of a filler, wherein the filler is comprised of calcium carbonate and between about 1% and about 15% by weight of a cellulosic and plastic component, wherein the cellulosic and plastic component comprises between about 1% and about 50% by weight of a filler water;
   the remainder water;
   wherein a cellulosic material in the cellulosic and plastic component is selected from a group consisting of cellulose, wood fiber, carbon, microcrystalline cellulose (MCC), starch, jute, hemp, paper, cardboard, or combinations thereof; and
   wherein the cellulosic and plastic component comprises a ratio of between about 55% and about 80% by weight of cellulosic material, and between about 45% to about 20% by weight of plastic material.

2. The composition according to claim 1, wherein the filler water in the cellulosic and plastic component is between about 10% and about 40% by weight, and a plastic material in the cellulosic and plastic component is selected from a group consisting of polyethylene terephthalate (PET), polypropylene (PP), polyethylene (PE), or combinations thereof.

3. The composition according to claim 1, wherein the cellulosic and plastic component is obtained from recycling plastic.

4. The composition according to claim 1, wherein the cellulosic and plastic component comprises a ratio of between about 60% and about 75% by weight cellulosic material, and between about 40% to about 25% by weight plastic material.

5. A composition for bonding a backing to a carpet face comprising:
   between about 15% and about 25% by weight of a latex base;
   between about 60% and about 75% by weight of a filler, wherein the filler is comprised of between about 1% and about 15% by weight of a cellulosic and plastic component, wherein the cellulosic and plastic component comprises between about 1% and about 50% by weight of a filler water;
   the remainder water; and
   wherein the cellulosic and plastic component comprises a ratio of between about 55% and about 80% by weight of cellulosic material, and between about 45% to about 20% by weight of plastic material.

6. The composition according to claim 5, wherein the cellulosic material in the cellulosic and plastic component is selected from a group consisting of cellulose, wood fiber, carbon, microcrystalline cellulose (MCC), starch, jute, hemp, paper, cardboard, or combinations thereof.

7. The composition according to claim 6, wherein the plastic material in the cellulosic and plastic component is selected from a group consisting of polyethylene terephthalate (PET), polypropylene (PP), polyethylene (PE), or combinations thereof.

8. The composition according to claim 7, wherein the cellulosic and plastic component is obtained from recycling plastic.

9. The composition according to claim 7, wherein the filler comprises calcium carbonate.

10. The composition according to claim 5, wherein the cellulosic and plastic component comprises a ratio of between about 60% and about 75% by weight of cellulosic material, and between about 40% to about 25% by weight of plastic material.

11. The composition according to claim 5, wherein the composition comprises between about 60% and about 65% by weight of the filler.

* * * * *